United States Patent [19]
Kuhn

[11] Patent Number: 5,858,447
[45] Date of Patent: Jan. 12, 1999

[54] MOLD INHIBITORS

[75] Inventor: Dale F. Kuhn, Shawnee Mission, Kans.

[73] Assignee: Tillin, Inc., Shawnee Mission, Kans.

[21] Appl. No.: 725,006

[22] Filed: Oct. 1, 1996

Related U.S. Application Data

[63] Continuation-in-part of Ser. No. 482,772, Jun. 7, 1995, abandoned, which is a continuation-in-part of Ser. No. 363,716, Dec. 23, 1994, abandoned, which is a continuation-in-part of Ser. No. 99,939, Jul. 30, 1993, abandoned.

[51] Int. Cl.$^6$ ........................................... A23L 3/34
[52] U.S. Cl. ........................ 426/654; 426/321; 426/323
[58] Field of Search ................................. 426/321, 323, 426/326, 331, 653, 654

[56] References Cited

U.S. PATENT DOCUMENTS

| | | | |
|---|---|---|---|
| 2,903,361 | 9/1959 | Marks et al. | 99/93 |
| 3,144,339 | 8/1964 | Dalby et al. | 99/91 |
| 3,404,987 | 10/1968 | Koolstra et al. | 99/150 |
| 3,617,312 | 11/1971 | Rose | 99/176 |
| 3,640,730 | 2/1972 | Rolland et al. | 99/91 |
| 3,692,534 | 9/1972 | Ueno et al. | 99/90 |
| 3,899,594 | 8/1975 | Nickerson et al. | 426/9 |
| 3,900,570 | 8/1975 | Stigler | 426/9 |
| 3,937,814 | 2/1976 | Nickerson et al. | 424/93 |
| 4,045,585 | 8/1977 | Appleman et al. | 426/331 |
| 4,330,562 | 5/1982 | Nassar | 426/310 |
| 4,372,982 | 2/1983 | Haasl et al. | 426/549 |
| 4,374,150 | 2/1983 | Harrell et al. | 426/19 |
| 4,416,904 | 11/1983 | Shannon | 426/19 |
| 4,434,185 | 2/1984 | Nelson | 426/308 |
| 4,529,609 | 7/1985 | Gaehring et al. | 426/532 |
| 4,592,915 | 6/1986 | Goyette et al. | 426/321 |
| 4,642,237 | 2/1987 | De Stefanis et al. | 426/64 |
| 4,659,576 | 4/1987 | Dahle et al. | 426/324 |
| 4,867,204 | 9/1989 | Ellis et al. | 138/118.1 |

(List continued on next page.)

FOREIGN PATENT DOCUMENTS

| | | |
|---|---|---|
| 5 6092-733 | 12/1979 | Japan . |
| 421006 | 12/1934 | United Kingdom . |

OTHER PUBLICATIONS

G. Hawley. Condensed Chemical Dictionary. 10$^{th}$ Ed. 1981. Van Nostrand Reinhold Company, New York. pp. 253, 254, and 1110.

*Primary Examiner*—Anthony J. Weier
*Attorney, Agent, or Firm*—Jeffrey L. Thompson

[57] ABSTRACT

The invention relates to novel mold growth inhibiting products for various foodstuffs, and a method of making and using the same. The mold growth inhibiting product is generally a mixture of various compounds, including: a first compound selected from the group consisting of azodicarbonamide or potassium bromate, a second compound selected from the group consisting of benzoic acid, sodium benzoate, calcium benzoate, potassium benzoate, paraben, acetic acid, lactic acid, fumaric acid, citric acid, potassium sorbate, sodium sorbate, calcium sorbate, sorbic acid, calcium propionate, potassium propionate, sodium propionate, propionic acid or mixtures thereof. In a second embodiment of the invention, a third compound is added which lowers the decomposition temperature of the azodicarbonamide. In a fifth embodiment of the invention, the mold growth inhibiting product is prepared by placing a layer of azodicarbonamide on a substrate means and then covering said layer with a gas permeable separator means. The second compound is then added on top of the separator and then the combination is heated to form the final product. In a seventh embodiment, the second compound is mixed with a gaseous mixture to yield a mold inhibitor product having little or no off-flavor, off-texture, off-color or off-odor. All embodiments of this invention are added to the foodstuff in the same or greater percentages of current day mold inhibitors, yet the resultant foodstuff has no off-flavor, taste or color which is normally imparted by current day mold inhibitors.

18 Claims, 3 Drawing Sheets

U.S. PATENT DOCUMENTS

| | | | |
|---|---|---|---|
| 4,925,684 | 5/1990 | Simon | 426/107 |
| 4,965,082 | 10/1990 | Chawan et al. | 426/331 |
| 5,017,612 | 5/1991 | Nayfa | 514/557 |
| 5,035,904 | 7/1991 | Huang et al. | 426/243 |
| 5,145,699 | 9/1992 | Dijkshoorn et al. | 426/94 |
| 5,161,549 | 11/1992 | Rosario | 131/331 |
| 5,180,604 | 1/1993 | Crane et al. | 426/582 |
| 5,194,271 | 3/1993 | Yasosky | 426/92 |
| 5,198,254 | 3/1993 | Nisperos-Carriedo et al. | 426/102 |
| 5,547,987 | 8/1996 | Bland et al. | 514/557 |

MOLD INHIBITORS

This is a continuation-in-part application of Ser. No. 08/482,772 entitled "Novel Mold Inhibitors and Methods of Making and Using the Same" filed Jun. 7, 1995, now abandoned, which was a continuation-in-part application of Ser. No. 08/363,716 entitled "Novel Mold Inhibitors and Methods of Making and Using the Same" filed Dec. 23, 1994, now abandoned, which was a continuation-in-part application of Ser. No. 08/099,939 entitled "Mold Inhibitory Compounds for Wheat Flour Products," filed Jul. 30, 1993, now abandoned, all of which are incorporated herein by reference.

FIELD OF THE INVENTION

This invention relates to novel mold growth inhibiting products for foodstuffs, and food preservatives generally. More particularly, this invention relates to novel compounds for inhibiting the growth of molds, yeasts and bacteria over a commercially reasonable time period in various food products, while eliminating the off-flavor, off-texture, off-color and/or odor which other known food preservatives impart.

BACKGROUND OF THE INVENTION

The growth of mold, yeasts and bacteria is a significant problem in packaged or processed foods such as dairy products, margarine, butter, baked goods, fruit and vegetable containing products such as fruit fillings for pies or pastries, and processed meats. The growth of mold, yeasts and bacteria not only significantly reduces the useful shelf life of the product, thus increasing the sellers' direct costs due to stale or moldy product which cannot be sold, but also requires that certain items be refrigerated during shipping and/or at the marketplace which causes additional indirect expenses for the end seller of the product.

Various food preservatives are on the market, yet when used at concentrations which effectively increase shelf life, the prior art food preservatives impart an off-flavor, odor, color and/or texture to the final product which is undesirable. Consequently, a need exists for a food preservative that increases the shelf life of the product while not requiring refrigeration or causing off-flavor, color, odor and/or texture.

PRIOR ART

Calcium propionate and potassium sorbate are recognized mold inhibitors. For example, U.S. Pat. Nos. 3,900,570 and 4,416,904 both disclose the use of calcium propionate, potassium sorbate and sodium benzoate at very low concentrations as optional mold inhibitors. For example, U.S. Pat. No. 3,900,570 discloses a maximum usage of calcium propionate of 0.25 parts by weight per 100 parts of flour in the finished dough, with the preferred range being about 0.06 to about 0.12 parts. In U.S. Pat. No. 4,416,904, similar concentrations are disclosed: 0.04% to 0.10% for sodium benzoate; 0.05% to 0.20% for sorbic acid, and 0.4% for calcium propionate. Contrarily, the novel compound of this invention may also be used at about the same ranges but also up to 5.0 percent by total weight of ingredients used to prepare the foodstuff with the optimum percentage depending on the food product and the desired shelf life.

The low concentrations of mold inhibitors used in prior art products are necessary due to the off-flavor, odor, taste and/or texture that is imparted by the propionate or sorbate when concentration levels are increased. To date, no one has effectively prepared a food preservative which incorporates either a propionate or sorbate such that when used at increased levels does not impart an undesirable off-flavor, odor, or texture.

Refrigeration has also been used to inhibit mold growth. However, for many food items, refrigeration is not available or is impractical due to limited space and excessive cost.

Consequently, a need exists for a product which inhibits the growth of mold and thus extends the shelf life of a foodstuff containing the mold inhibiting product while not imparting an off-flavor, either bitter or acidic, off-odor and/or texture. It is even more desirable that increased mold inhibition without adverse side effects be accomplished without the need for refrigeration. Additionally, the mold growth inhibiting product should use relatively inexpensive and available ingredients in such quantities as to be commercially economical.

SUMMARY OF THE INVENTION

The present invention provides novel compounds, and methods of making and using the same, for inhibiting the growth of molds, yeasts and bacteria in dairy products such as margarine, butter, cream cheese, whipped cream, and shredded cheese; baked goods such as bagels, pound cake and pastries; fried goods such as corn and wheat tortillas; fruit containing products such as fruit fillings for pies and pastries; and processed meats. The foodstuffs incorporating the products of this invention have increased shelf lives because the products are more effective than current day mold inhibitors.

Six of the seven embodiments of the novel compound and method include a first compound which is either azodicarbonamide or potassium bromate, preferably azodicarbonamide.

In the first embodiment, a second compound is mixed with the first compound, the second compound is selected from the group consisting of potassium sorbate, sodium sorbate, calcium sorbate, sorbic acid, calcium propionate, potassium propionate, sodium propionate, propionic acid, citric acid, lactic acid, fumaric acid, benzoic acid, sodium benzoate, calcium benzoate, potassium benzoate, paraben, acetic acid, calcium acetate or mixtures thereof.

In the second embodiment, a third compound is added to the first and second compounds which lowers the decomposition temperature of azodicarbonamide.

In either the first or second embodiment, the novel mold growth inhibiting product is ultimately a dry powder mixture. The manner in which either embodiment is added to the food product is dependent on the temperature at which the food product will be processed.

In conjunction with the first embodiment, if the foodstuffs will be baked or processed at temperatures of about 212° F. or above, the compound is added directly to the raw ingredients used to prepare the final product. If the processing temperature is below about 212° F., the dry mixture is initially added to water in a ratio of about 0.25 pound of mold inhibiting product to every 3 ounces of water and then heated to a temperature of about 212° F. to about 475° F., preferably about 400° F., for a sufficient time, about 20 to about 30 minutes, preferably 25 minutes. The resultant product is ground to about the same fineness as the azodicarbonamide before processing, about 3 μm, and then added to the other ingredients of the food product at about 0.01 to about 20.0 percent by total weight of the raw ingredients for the foodstuff.

In conjunction with the second embodiment which contains the third compound, if the foodstuffs will be baked or processed at temperatures of above about 140° F., the mold growth inhibiting product is added directly to the raw ingredients of the foodstuff. If the processing temperature is below this range, the dry mixture of the second embodiment is added to water in a ratio of about 0.25 pound mold growth inhibiting product to every 3 ounces of water and then heated to a temperature of about 140° F. to about 475° F., preferably about 212° F. to 365° F., for a sufficient time, about 6 to about 10 minutes, preferably about 8 minutes. The resultant product is ground to about the same fineness as the azodicarbonamide before processing, about 3 $\mu$m, and then added to the raw ingredients of the foodstuff at about 0.5 to about 5.0 percent by total weight of raw ingredients.

The third embodiment of this invention is a liquid mixture of water and a dry mixture of azodicarbonamide as the first compound and a second compound selected from the group consisting of lactic acid, citric acid, fumaric acid, potassium sorbate, sodium sorbate, calcium sorbate, sorbic acid, calcium propionate, potassium propionate, sodium propionate, propionic acid, benzoic acid, sodium benzoate, calcium benzoate, potassium benzoate, paraben, acetic acid, calcium acetate or mixtures thereof. The ratio of water to dry mixture is about 4:1 to about 8:1 by weight percent.

The fourth embodiment of this invention is a liquid mixture of water and a dry mixture of azodicarbonamide as the first compound, lactic acid, fumaric acid, potassium sorbate, sodium sorbate, calcium sorbate, sorbic acid, calcium propionate, potassium propionate, sodium propionate, propionic acid, acid, benzoic acid, sodium benzoate, calcium benzoate, potassium benzoate, paraben, acetic acid, calcium acetate or mixtures thereof as the second compound, and a third compound which lowers the decomposition temperature of azodicarbonamide. The ratio of water to dry mixture is about 4:1 to about 8:1 by weight percent.

In both the third and fourth embodiments, after the water is added to the dry mixture, the combination is boiled for about 15 minutes and then let cool. After cooling, additional water is added to replace the amount of liquid lost during the boiling stage. The liquid mold growth inhibiting product is added to the foodstuff at a rate of about 0.01 to about 20.0 percent by total weight of raw ingredients of the foodstuff.

In a fifth embodiment of the invention, the mold growth inhibiting product is prepared by placing a layer of azodicarbonamide on a substrate means and then covering said layer with a gas permeable separator means. The second compound which is generally a carboxylic acid, is then added on top of the separator and then the combination is heated to form the final product. In a sixth embodiment, the third compound is added to the azodicarbonamide and the mixture is then placed on the substrate means. The mixture is then covered with the separator means and the second compound, which is generally a carboxylic acid, is overlaid on the separator means. The combination is then heated to produce the final product.

In a seventh embodiment, the second compound, which is generally a carboxylic acid, is mixed with a gas selected from the group consisting of nitrogen, carbon monoxide, carbon dioxide, helium and ammonia or mixtures thereof to yield a mold inhibitor product having little or no off-flavor, off-texture, off-color or off-odor.

Although not wanting to be bound by one theory, it is believed by heating the mold growth inhibiting products of this invention, either during processing or before the mold growth inhibiting product is added to the raw materials of the foodstuff, the azodicarbonamide reacts with the second compound to eliminate the off-flavor, odor and texture normally imparted by current day mold growth inhibitors such as sorbates or propionates.

DETAILED DESCRIPTION OF THE INVENTION

As required, a detailed embodiment of the present invention is disclosed herein. It is, however, to be understood that the disclosed embodiment is merely illustrative of the invention, which may be embodied in various forms. Therefore, specific structural and functional details disclosed herein are not to be interpreted as limiting, but merely as a basis for the claims and as a representative basis for teaching one skilled in the art to employ the mold inhibitory compound in the appropriate products.

In accordance with the present invention, a mold growth inhibiting product is provided for wheat or corn based bakery products, dairy products, fruit containing products such as pie or pastry fillings, and processed meats.

The first embodiment of the mold growth inhibiting product is a dry powder mixture comprised of a first compound which is azodicarbonamide or potassium bromate, preferably azodicarbonamide, and a second compound which is selected from the group consisting of citric acid, lactic acid, fumaric acid, potassium sorbate, sodium sorbate, calcium sorbate, sorbic acid, calcium propionate, potassium propionate, sodium propionate, propionic acid, benzoic acid, sodium benzoate, calcium benzoate, potassium benzoate, paraben, acetic acid, calcium acetate, or mixtures thereof, preferably calcium propionate, sodium propionate, potassium sorbate or mixtures thereof.

In reference by total weight of the mold growth inhibiting product, in the first embodiment, the first compound is present in the amount of about 0.001 to about 5.0 percent by weight, preferably about 0.001 to about 0.01; and the second compound is present in the amount of about 99.999 to about 95.0 percent by weight, preferably 99.999 to about 99.99.

Azodicarbonamide is an organic salt normally used as a dough conditioner or oxidizing agent in the food industry. It is also used as a blowing agent in the rubber industry. Azodicarbonamide is normally used in baked goods to reduce the stickiness of the dough which in turn makes processing easier. To date, it has not been used or approved as an ingredient for mold inhibiting products. In fact, FDA approval has only issued for using azodicarbonamide as a maturing or oxidizing agent. Azodicarbonamide is commercially available under the trademark "AZ-130", from the Sherex Chemical Company of New York as well as other sources. When it reacts with the second compound it provides the unexpected results of altering the second compound such that the final product will not impart an off-flavor, off-odor, off-texture or off-color to the foodstuff.

If the first embodiment will be added to foodstuffs which are exposed to temperatures above about 212° F. during processing, the first embodiment is added directly to the raw ingredients of the foodstuff at about 0.01 to about 20.0 percent by total weight of raw ingredients, preferably about 0.5 to about 5.0 percent.

If the foodstuff will not be exposed to temperatures of above about 212° F., the first embodiment is added to water in a ratio of about 0.25 lb of first embodiment to every 3 ounces of water and then heated to a temperature of about 212° F. to about 475° F., preferably about 400° F., for a sufficient time, about 20 to about 30 minutes, preferably 25 minutes. The resultant product is ground to about the same fineness as the azodicarbonamide before processing, about 3 $\mu$m, and then added to the raw ingredients of the food product at about 0.01 to about 20.0 percent by total weight of raw ingredients used to produce the foodstuff.

The second embodiment comprises azodicarbonamide or potassium bromate, preferably azodicarbonamide, and the second compound of the first embodiment and a third compound which reduces the decomposition temperature of azodicarbonamide. The third compound is a metal oxide such as zinc oxide, a metal salt, an organometallic complex such as barium, zinc, or calcium stearate, or other compounds such as citric acid, triethanolamine, or calcium sulfate, the preferred being citric acid or zinc oxide.

In reference by weight of mold growth inhibiting product, in the second embodiment, the first compound is present in the amount of about 0.001 to about 5.0 percent by weight, preferably about 0.001 to about 0.01; the second compound is present in the amount of about 99.995 to about 70.0 percent by weight, preferably 99.995 to about 98.59; the third compound is present in the amount of about 0.004 to about 30.0 percent by weight, preferably 0.004 to about 1.4.

Again, whether initial processing of the second embodiment of the mold inhibitory compound is required will be dependent on the temperature at which the foodstuff is processed.

If the foodstuff will be processed at temperatures above about 140° F., the second embodiment of the mold growth inhibiting product is added directly to the raw ingredients of the foodstuff. If the processing temperature is below this range, the second embodiment is added to water in a ratio of about 0.25 lb of the second embodiment to every 3 ounces of water and then heated to a temperature of about 140° F. to about 475° F., preferably about 212° F. to about 365° F., for a sufficient time, about 6 to about 10 minutes, preferably about 8 minutes.

The third embodiment of the novel mold growth inhibiting product of this invention is comprised of about 1 part by weight of dry mixture to about 4 to 8 parts by weight of water. For example, 100 grams of dry mixture would be mixed with about 400 to about 800 grams of water, preferably about 600 grams. The dry mixture is comprised of a first compound as discussed above in reference to the first embodiment, and a second compound which is selected from the group consisting of citric acid, lactic acid, fumaric acid, potassium sorbate, sodium sorbate, calcium sorbate, sorbic acid, calcium propionate, potassium propionate, sodium propionate, propionic acid, benzoic acid, sodium benzoate, calcium benzoate, potassium benzoate, paraben, acetic acid, calcium acetate, or mixtures thereof, preferably calcium propionate, sodium propionate, potassium sorbate or mixtures thereof.

In reference by weight of mold growth inhibiting product, in the third embodiment, the first compound is present in the amount of about 0.001 to about 5.0 percent by weight, preferably about 0.001 to about 0.01; the second compound is present in the amount of about 99.999 to about 95.0 percent by weight, preferably 99.999 to about 99.99.

The fourth embodiment of the novel mold growth inhibiting product of this invention is comprised of about 1 part by weight of dry mixture to about 4 to 8 parts by weight of water. For example, 100 grams of dry mixture would be mixed with about 400 to about 800 grams of water, preferably about 600 grams. The dry mixture is comprised of the first compound discussed above in reference to the first embodiment, a second compound which is selected from the group consisting of lactic acid, fumaric acid, potassium sorbate, sodium sorbate, calcium sorbate, sorbic acid, calcium propionate, potassium propionate, sodium propionate, propionic acid, benzoic acid, sodium benzoate, calcium benzoate, potassium benzoate, paraben, acetic acid, calcium acetate, and mixtures thereof, preferably calcium propionate, sodium propionate, potassium sorbate or mixtures thereof, and a third compound which lowers the decomposition temperature of the first compound which was previously described above in relation to the second embodiment.

In reference by weight of mold growth inhibiting product, in the fourth embodiment, the first compound is present in the amount of about 0.001 to about 5.0 percent by weight, preferably about 0.001 to about 0.01; the second compound is present in the amount of about 99.995 to about 70.0 percent by weight, preferably 99.995 to about 98.59; the third compound is present in the amount of about 0.004 to about 30.0 percent by weight, preferably 0.004 to about 1.4.

The third and fourth embodiments are prepared by dissolving the dry mixture in the water to form a first product. The first product is then boiled for about 15 minutes to form a second product. The second product is allowed to cool and then filtered to remove any non-liquid residue. Additional water is then added to the filtered second product to replace the liquid lost during boiling.

The third and fourth embodiments are added directly to the raw materials of the foodstuff or if the foodstuff is a liquid in final form, the third embodiment may be added directly to the final foodstuff. The third and fourth embodiments are added at about 0.01 to about 20.0 percent by weight of raw ingredients of final foodstuff, preferably 0.5 to about 5.0 percent by weight.

Figure 3:
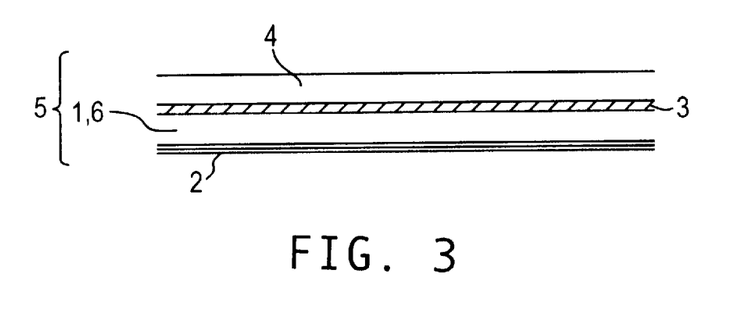
FIG. 3 is a cross sectional view of the tri-layered combination of the fifth and sixth embodiments of the present invention.

Referring to FIG. 3, the fifth embodiment for the novel mold growth inhibiting product consists generally of creating a tri-layered combination of materials and then heating the same. A substantially uniform first layer 1 comprising azodicarbonamide is placed on a substrate means 2, which may be any material capable of serving as a base to hold a layer of azodicarbonamide and withstanding temperatures between about 200°–500° F., but is preferably a planar metal baking sheet or the like. Next, means 3 to separate two (2) layers of compounds having gas permeability is then overlaid on the azodicarbonamide. The gas permeable separator means 3 may be comprised of any material which acts to separate two layers of dry compounds yet is permeable to air and other gases. Stainless steel wire mesh is the preferred material to serve this purpose. A second compound 4 which is generally a carboxylic acid, selected from the group consisting of citric acid, lactic acid, fumaric acid, potassium sorbate, sodium sorbate, calcium sorbate, sorbic acid, potassium propionate, sodium propionate, calcium propionate, propionic acid, benzoic acid, sodium benzoate, calcium benzoate, potassium benzoate, paraben, acetic acid, calcium acetate, or mixtures thereof is then superimposed onto the separator means to form a tri-layered combination 5. The tri-layered combination 5 is then heated for a sufficient time and at a sufficient temperature to alter the characteristics of said second compound, namely to eliminate the off-flavor, off-odor, off-texture and off-color generally imparted by the second compound. Although not desiring to be bound by one theory, applicant believes that during the heating step, the azodicarbonamide decomposes thereby emitting gases which permeate the separator means 3 and react with the second compound 4 thereby creating the desired mold inhibiting product. The gases are believed to be nitrogen, carbon monoxide, carbon dioxide and ammonia. The desired results have been achieved by heating the tri-layered combination at greater than about 320° F., preferably 385° F., for about 20 minutes. The final product, which is in dry power form, can then be added directly to the raw ingredients of the foodstuff at about 0.01 to about 20.0 percent by total weight of raw ingredients, preferably about 0.5 to about 5.0 percent.

Again referring to FIG. 3, the sixth embodiment of the product of this invention is generally prepared by mixing a decomposition enhancing compound with the azodicarbonamide to form a dry mixture 6. The mixture 6 is then placed on the substrate means 2 of the fifth embodiment. The mixture 6 is then covered with said separator means 3 and said second compound, which is generally a carboxylic acid, is overlaid on the separator means 3 to form a tri-layered combination 5. The combination 5 is then heated at a sufficient temperature for a sufficient time to produce the desired final product. The decomposition enhancing compound is added to reduce the decomposition temperature of the azodicarbonamide. The decomposition enhancing compound is the same as that referred to as the third compound in the description of the second embodiment. About 0.004 to about 30.0 percent by weight of the third compound is mixed with the azodicarbonamide with the preferred range being 0.004 to about 1.4 percent.

Without the addition of the decomposition enhancing compound, the decomposition temperature of azodicarbonamide is about 360° F., but the addition of the third compound lowers the decomposition temperature to about 320° F. Upon decomposition, the azodicarbonamide releases gases such as nitrogen, carbon monoxide, carbon dioxide, and ammonia which react with the carboxylic acid(s) to achieve the desired results.

Figure 4:
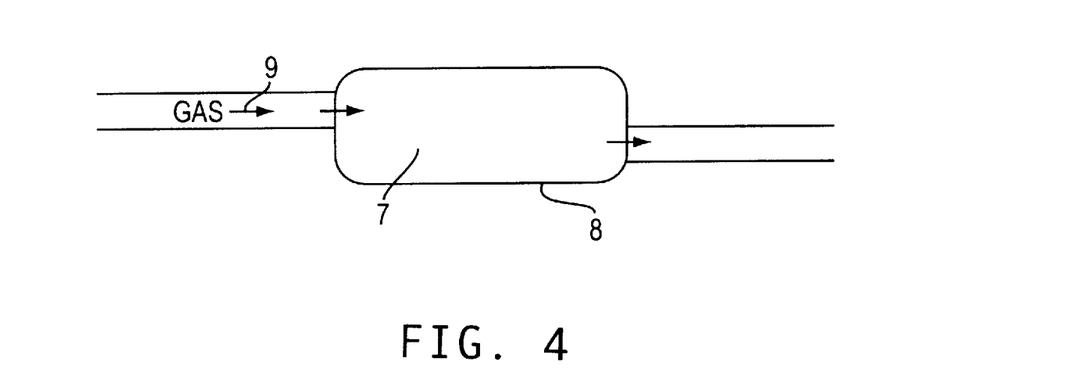
FIG. 4 is a perspective view of the seventh embodiment of the present invention.

Referring to FIG. 4, the seventh embodiment of the novel mold growth inhibiting product of this invention is prepared by first placing a carboxylic acid 7 selected from the group consisting of citric acid, lactic acid, fumaric acid, potassium sorbate, sodium sorbate, calcium sorbate, sorbic acid, potassium propionate, sodium propionate, calcium propionate, propionic acid, benzoic acid, sodium benzoate, calcium benzoate, potassium benzoate, paraben, acetic acid, calcium acetate, or mixtures thereof inside a gas-tight chamber means 8. The chamber means 8 can be any suitable container to hold carboxylic acid 7, is gas-tight and allows gases to mix with the carboxylic acid 7.

The carboxylic acid 7 is then mixed with gases 9 selected from the group consisting of nitrogen, carbon monoxide, carbon dioxide, ammonia, helium or mixtures thereof. A mixture of gases comprising about 30% to about 70% nitrogen, about 10% to about 30% carbon monoxide, about 2% to about 10% carbon dioxide, and about 2% to about 10% ammonia is preferred. The carboxylic acid 7 is exposed to the gases 9 for a sufficient time for a uniform exposure to achieve the desired result of creating a food preservative product that does not impart an off-flavor, off-odor, off-color or off-texture. The time of exposure is dependent on the size of the chamber 8 and the amount of carboxylic acid 7 to be mixed with the gas. The carboxylic acid and the gas may be heated as an alternative method to achieve the desired results.

All embodiments can be added directly to the raw ingredients for preparing the foodstuff. The resultant product is ground to about the same fineness as the azodicarbonamide before processing, about 3 μm, and then added to the other raw ingredients of the foodstuff at about 0.01 to about 20.0 percent, preferably about 0.5 to about 5.0 percent by total weight of the raw ingredients used to prepare the foodstuff. For example, either the first or second embodiment can be incorporated into wheat flour dough by adding it to the flour. Any one of the seven embodiments could be added to the moist dough, although the addition of the third and fourth embodiment may be less desirable as it adds additional water into the dough. Further, the mold inhibiting products of this invention also inherently inhibit bacterial growth and/or are bactericidal and, thus, have far reaching applications.

As an example of how to prepare tortillas comprising the mold growth inhibiting product of this invention, when making wheat tortillas, the preferred ratio is one percent (1%) of the mold growth inhibiting product of the first or second embodiment to the weight of the dry flour mix, although effective results have been obtained with a one half percent (½%) to one and one half percent (1½%).

Satisfactory results have been obtained utilizing the following formula for the mold growth inhibiting product of the first embodiment.

TABLE 1

| INGREDIENT | PERCENT BY WEIGHT |
| --- | --- |
| Azodicarbonamide | 0.004% |
| Potassium Sorbate | 49.998% |
| Calcium Propionate | 49.998% |

These percentages are considered optimal for tortillas; however, differing percentages may be appropriate under other circumstances. For example, certain wheat flour mixtures may require smaller or greater percentages. The percentages provided are intended to be exemplary of a preferred composition.

The following examples are set forth to exemplify the invention and should not be used to limit the invention.

EXAMPLE 1A

In tests conducted by the American Institute of Baking, a commercially produced tortilla flour was produced using 500 grams of QUAKER flour mix and 215 grams of water at 100° F. The water and flour mixture was mixed at two minutes at a low speed and for another two minutes at a higher, second speed with a dough hook. The dough was allowed to stand for five minutes and then divided into 50-gram balls which were heat pressed at 175° F. The raw tortillas were then baked on a griddle at 450° F. for 30 seconds on each side with each side heated two times.

Tests were conducted under controlled conditions with certain flour tortillas identified as control specimens. Certain other specimens were prepared using 1.0 percent by weight of the mold growth inhibiting product of this invention and 99.0 percent by weight of flour mixture in accordance with the same procedure set forth above for the control specimens. Tortillas from each test batch were evaluated after baking for flavor, odor, eating quality, and mold. The mold growth inhibiting product was comprised of the percentages set forth above in Table 1.

A first test batch of each set were heat sealed in cellophane bags, double-bagged in ziplock freezer pouches and stored at 25° C.

A second test batch of each set of tortillas were inoculated with mold colonies isolated from previously molded bakery products and then also stored at 25° C.

All test batches of tortilla samples were checked daily for visual signs of mold growth over a 21-day period.

By the end of the seventh day, visible signs of mold were present on the control wheat flour tortillas. However, the tortilla specimens containing the mold growth inhibiting product of this invention had not molded by the end of the 21-day test. Additionally, tortillas containing the disclosed mold inhibitory composition had no off-flavor or undesirable texture at the 21-day period or at any time after baking. From the results of this test, The American Institute of Baking concluded that the disclosed mold growth inhibiting product is an effective mold inhibitor in the production of wheat flour tortillas.

EXAMPLE 1B

Additional tests were run using the method of preparation disclosed in Example 1A. The tortillas (both the control batch and the batch containing the mold inhibitory compound) were subjected to 90° F. for a period of 30 days. After such extreme conditions, the tortillas containing the mold growth inhibiting product of this invention still exhibited no mold growth, although under the extreme conditions the tortillas did have a stale taste.

EXAMPLE 1C

Tests were also run comparing the tortillas prepared in accordance with the procedure outlined in Example 1A with tortillas containing 1.5 percent of a commercially available mold inhibitor. Both sets of tortillas did not mold after 21 days. However on day 1, the tortillas containing the commercially available mold inhibitor had a very acidic taste whereas the tortillas containing the mold growth inhibiting product of this invention had no acidic taste. Taste tests were run again at the 14 day mark. The tortillas containing the commercially available mold inhibitor had a bitter taste whereas the tortillas containing the mold growth inhibiting product of this invention had no acidic taste.

EXAMPLE 2A

Tests were performed on corn tortillas manufactured with MASECA corn flour. One set included 0.7% by weight of sodium propionate as representative of a commercially available mold inhibitor. The other set included 1.0% of the mold growth inhibiting product of this invention as set forth in Table 1.

The tortillas were prepared similarly to the method disclosed in Example 1A. During the testing period, the humidity was maintained at 90% and the temperature was maintained at 115° F.

The dough and the tortillas of the test batch that contained the sodium propionate was off color with a light yellow appearance. No off color existed in the dough or the tortillas of the test batch containing the mold inhibitor of this invention. Other characteristics such as odor, flavor, and palatability were comparable.

The tortillas containing sodium propionate molded within 7 days. The tortillas containing the mold inhibitor as set forth in Table 1 molded in 13 days.

EXAMPLE 2B

Tests were performed on corn tortillas manufactured with MASECA corn flour. One set included 0.7% by weight of sodium propionate as representative of a commercially available mold inhibitor. The other set included 1.0% of the mold growth inhibiting product of this invention encompassing the second embodiment. The mold inhibitor was comprised of 0.088% by weight of citric acid, 49.954% by weight calcium propionate, 49.954% by weight potassium sorbate, and 0.004% by weight of azodicarbonamide.

The tortillas were prepared similarly to the method disclosed in Example 1A. During the testing period, the humidity was maintained at 90% and the temperature was maintained at 115° F.

The dough and the tortillas of the test batch that contained the sodium propionate was off color with a light yellow appearance. No off color existed in the dough or the tortillas of the test batch containing the mold inhibitor of this invention. Other characteristics such as odor, flavor, and palatability were comparable.

The tortillas containing sodium propionate molded within 7 days. The tortillas containing the mold inhibitor of this invention molded in 15 days.

EXAMPLE 3

Tests were run to determine the effectiveness of the disclosed mold inhibitor compound in Neufchatel Cheese (cream cheese). Each sample included 8 ounces of cream cheese. Four different test batches were prepared. The first was a control with no mold growth inhibiting products added. The remaining 3 batches contained, 0.750%, 0.500%, and 0.250%, respectively of a mold growth inhibiting product of this invention comprised of 0.088% by weight of citric acid, 49.954% by weight calcium propionate, 49.954% by weight potassium sorbate, and 0.004% by weight of azodicarbonamide.

Except for the control, all samples were heated to 212° F. and held at that temperature for five minutes. The samples were then placed on aluminum foil. After cooling, all samples were covered with plastic wrap.

On Day 3 the control began to exhibit mold. On Day 7, the 0.250% sample began to show slight yellowing on the plastic wrap. On Day 17 the test was discontinued and the remaining samples tested. No mold appeared on either sample. Additionally the taste was good and the no offensive odor existed in either sample.

EXAMPLE 4

Tests were run to determine the effectiveness of a mold growth inhibiting product of this invention in cream cheese that is applied to a pre-formed, refrigerated Danish-style pastry dough.

0.25%, 0.50% and 0.625% respectively of a mold growth inhibiting product of this invention comprised of 0.088% by weight of citric acid, 49.954% by weight calcium propionate, 49.954% by weight potassium sorbate, and 0.004% by weight of azodicarbonamide, was added to 8 ounces of cream cheese. The cream cheese was then applied to the center of a pre-formed, refrigerated Danish-style pastry dough. The samples were baked at 383° F.–392° F., placed on aluminum foil, cooled, and packaged in polyethylene zipper closed bags and held at 32° C. No off-odor or off-taste was noted at the baking stage.

By Day 3, noticeable mold spots were forming on the control cheeses. By Day 6, all of the control rolls were developing molds. The test was terminated after 19 days. Despite heavy mold infestation of the rolls themselves, the cream cheese which contained the mold inhibiting product did not show signs of mold.

EXAMPLE 5

Two sampled of corn tortillas were prepared. The first sample (Tl) was prepared by mixing 2 cups flour, 1 and ½ cup water, and 4.275 g of calcium propionate as the mold inhibiting product. The second sample (T2) was prepared by mixing 2 cups flour, 1 and ½ cup water, and 4.275 g of the mold inhibiting product of this invention which was comprised of 0.004% by weight of azodicarbonamide, 0.004% by weight of citric acid and the remainder being calcium propionate.

For each sample, all ingredients were mixed and 40 gram balls were flattened into approximately 6" round tortillas. The tortillas were each cooked on a hot griddle for approximately three minutes and then allowed to cool.

The pH of the dough and the finished product dissolved in water were taken. Odor and taste tests were also run with 5 being the best and 1 being the worst. The results are recorded below. The first number is the number of persons and the second number is the rating.

| TEST | T1 Results | T2 Results |
| --- | --- | --- |
| pH Raw | 5.60 | 5.77 |
| pH finished | 5.64 | 5.50 |
| Odor | 6/5 | 6/5 |
| Taste | 6/5 | 6/5 |
| Best Overall | 3/1, 3/2 | 3/1, 3/2 |

From the results listed above, no difference in taste or odor was initially found and no preference was indicated by the participants of the test.

After sampling and testing was complete, the tortillas were placed in an environment chamber maintained at about 80° to 85° F. and monitored daily for signs of mold. After 19 days the test was discontinued. Neither product showed signs of mold but T1 had a distinctive, unpleasant odor while T2 had no unpleasant odor.

EXAMPLE 6

Five samples of apple walnut muffins were prepared using the following recipe. 127.69 g flour, 39.84 g crisco, 45.45 g sugar, 25.54 g eggs, 3.58 g eggs, 4.26 g baking powder, 0.72 g cinnamon, 1/10 tsp. nutmeg, 68.44 g milk, 58.26 g shredded peeled apples, and 45.97 g walnut. T1 was the control and included no mold inhibiting agent. T2 included 1.27 g of mold inhibiting product comprised of 0.004% by weight of citric acid, 0.004% azodicarbonamide, and the remainder being calcium propionate. T3 included 1.91 g of mold inhibiting product comprised of 0.004% by weight of citric acid, 0.004% azodicarbonamide, and the remainder being calcium propionate. T4 included 1.27 g of mold inhibiting product comprised of 19.0% by weight of citric acid, 0.004% azodicarbonamide, and the remainder being calcium propionate. T5 included 1.91 g of mold inhibiting product comprised of 19.0% by weight of citric acid, 0.004% azodicarbonamide, and the remainder being calcium propionate.

All five samples were baked for 18 minutes at 375 F. Each were cooled and then placed in individual plastic zipper locked bags.

Tests were run on each sample, including the pH of the flour and mold inhibiting product dissolved in water, the pH of a portion of a baked muffin dissolved in water, and the odor and taste of the baked muffin. The following results were obtained with 5 being the best and 1 being the worst and the first number being the number of people issuing the rating.

TABLE 2

| Sample | pH Flour | pH muffin | Odor | Taste |
| --- | --- | --- | --- | --- |
| T1 | 7.32 | 7.02 | 3/5, 1/4, 1/3 | 2/4, 1/5, 2/3 |
| T2 | 6.72 | 6.58 | 4/5, 1/5 | 4/5, 1/5 |
| T3 | 6.53 | 6.28 | 4/5, 1/4 | 4/5, 1/4 |
| T4 | 6.92 | 6.78 | 3/5, 2/4 | 3/5, 1/3, 1/4 |
| T5 | 7.01 | 6.85 | 5/5 | 3/5, 1/4, 1/3 |

The samples were monitored daily for signs of mold. Signs of mold appeared in three days on T1, five days in T2, six days in T3, 12 days in T4 and 9 days in T5.

EXAMPLE 7

10 samples (T1–T10) of flour tortillas were prepared by adding the indicated percentage by weight of flour of a mold growth inhibiting product of this invention to 454 g of all purpose flour and mixing with 236.08 g water for each sample. The following formulations of mold growth inhibiting product and percentages were used.

TABLE 3

| Sample | Percentage | Formulation by Weight % |
| --- | --- | --- |
| T1 added | 0.0 | Control - no mold growth inhibitor |
| T2 | 1.0 | 71% Sodium Propionate, 28.996% Citric Acid, and 0.004% Azodicarbonamide |
| T3 | 1.0 | 99.992% Calcium Propionate, 0.004% Citric Acid, and 0.004% Azodicarbonamide |
| T4 | 1.0 | 99.992% Sodium Propionate, 0.004% Zinc Oxide, and 0.004% Azodicarbonamide |
| T5 | 1.0 | 99.992% Calcium Propionate, 0.004% Zinc Oxide, and 0.004% Azodicarbonamide |
| T6 | 1.0 | 64.998% Calcium Propionate, 34.998% Potassium Sorbate, and 0.004% Azodicarbonamide |
| T7 | 1.0 | 80.998% Calcium Propionate, 18.998% Citric Acid, and 0.004% Azodicarbonamide |
| T8 | 1.0 | 80.998% Sodium Propionate, 18.998% Citric Acid, and 0.004% Azodicarbonamide |
| T9 | 1.0 | 80.998% Sodium Propionate, 18.998% Zinc Oxide, and 0.004% Azodicarbonamide |
| T10 | 1.0 | 80.998% Calcium Propionate, 18.998% Zinc Oxide, and 0.004% Azodicarbonamide |

For each sample, all ingredients were mixed and 40 gram balls were flattened into approximately 6" round tortillas. The tortillas were each cooked on a hot griddle at 450 F. to 475 F. for approximately three minutes and then allowed to cool.

All samples were placed in an environmental chamber maintained at 80 F. to 85 F. Samples were checked daily for mold growth. The test was started on Apr. 21, 1995, and Apr. 24, 1995. The test was terminated on May 22, 1995. The following results were obtained.

TABLE 4

| Sample | Start Date | Termination Date (When mold appeared) |
| --- | --- | --- |
| T1 | 4/21/95 | 4/26/95 |
| T2 | 4/21/95 | 5/22/95 (still mold-free) |
| T3 | 4/21/95 | 5/22/95 (still mold-free) |

TABLE 4-continued

| Sample | Start Date | Termination Date (When mold appeared) |
|---|---|---|
| T4 | 4/21/95 | 4/29/95 |
| T5 | 4/21/95 | 4/30/95 |
| T6 | 4/24/95 | 5/10/95 |
| T7 | 4/24/95 | 5/10/95 |
| T8 | 4/24/95 | 5/22/95 (still mold-free) |
| T9 | 4/24/95 | 5/4/95 |
| T10 | 4/24/95 | 5/5/95 |

Taste tests were also completed after the products were grilled. The following results were obtained.

TABLE 5

| Sample | Taste Test Findings |
|---|---|
| T1 | No odor, good taste |
| T2 | Slight smell, good taste |
| T3 | No odor, good taste |
| T4 | No odor, good taste |
| T5 | No odor, good taste |
| T6 | No odor, good taste |
| T7 | No odor, good taste |
| T8 | No odor, good taste |
| T9 | NO odor, good taste |
| T10 | NO odor, good taste |

On samples T1 through T5, the preferred sample was either T1, T2, or T3, no one being able to differentiate one from the other. On samples T6 through T10, no one could differentiate between the samples.

EXAMPLE 9

Testing was performed on prior art mold inhibitors and samples of the mold growth inhibiting products of this invention to determine pH, color, odor, and taste of the various products.

A pre-pH test was run on each sample by mixing 5 grams of sample with 45 grams of water. The pre-pH test results are listed below.

For the remaining tests, each sample mixture consisted of 45 grams of mold inhibiting product and 30 grams of water. Each sample was dried in a 380 F. oven for 20 minutes and then allowed to dry completely in a 250 F. oven for up to 10 minutes longer. The color, odor and taste of each treated sample was then recorded. Post pH was also taken of the treated sample by adding 5 grams of the treated sample with 45 grams water.

The samples were comprised of the following ingredients in weight percent, T1—100% Potassium Sorbate; T2—100% Sodium Propionate; T3—1000 Calcium Propionate; T4—1000 Citric Acid; T5—99.992% Potassium Sorbate, 0.004% Citric Acid and 0.004% Azodicarbonamide; T6—99.992% Potassium Sorbate, 0.004% Zinc Oxide and 0.004% Azodicarbonamide; T7—99.992% Potassium Propionate, 0.004% Citric Acid and 0.004% Azodicarbonamide; T8—99.992% Potassium Propionate, 0.004% Zinc Oxide and 0.004% Azodicarbonamide; T9—99.992% Calcium Propionate, 0.004% Citric Acid and 0.004% Azodicarbonamide; T10—99.992% Calcium Propionate, 0.004% Zinc Oxide and 0.004% Azodicarbonamide; T11— 99.992% Citric Acid, 0.004% Zinc Oxide and 0.004% Azodicarbonamide; and T12—99.996% Citric Acid and 0.004%. Azodicarbonamide.

The following results were recorded.

TABLE 6

| # | Pre-pH | Post-pH | Color | Odor | Taste |
|---|---|---|---|---|---|
| T1 | 9.12 | 9.56 | Off-White | Slight | Slightly Bitter |
| T2 | 7.92 | 9.56 | Off-White | Slight | Slightly Bitter |
| T3 | 8.01 | 8.97 | Off-White | Slight | Slightly Bitter |
| T4 | 1.90 | 1.86 | Orange | Slight | Bitter |
| T5 | 7.41 | 8.68 | Light Cream (Lighter than control) | None | None |
| T6 | 7.41 | 8.89 | Light Cream (Lighter than control) | None | None |
| T7 | 7.19 | 8.76 | White | None | None |
| T8 | 7.68 | 8.56 | White | None | None |
| T9 | 7.48 | 7.28 | White | None | None |
| T10 | 7.45 | 7.39 | White | None | None |
| T11 | 1.68 | 1.46 | Clear | None | Not as Tangy |
| T12 | 1.80 | 1.44 | Clear | None | Not as Tangy |

EXAMPLE 10

Field tests were designed to determine the effectiveness of the mold growth inhibitors of this invention on all aspects of cheese manufacture, maturation, functionality and flavor.

The protocol was designed with Vat 1 being the Control, i.e.. no mold growth inhibitor added, Vat 2 including 0.25 percent by weight of total raw ingredients for preparing the cheese product being a mold growth inhibitor of this invention, and Vat 3 including 0.50 percent by weight of total raw ingredients for preparing the cheese product being a mold growth inhibitor of this invention. The mold growth inhibitor was comprised of 49.991% by weight calcium propionate, 49.991% by weight potassium sorbate, 0.004% by weight citric acid, and 0.004% by weight azodicarbonamide.

Table 7 below lists the parameters used in preparing the mozzarella cheese. Table 8 below lists the parameters used in preparing the cheddar cheese. The mold growth inhibitor was listed as Substance X and was added two minutes after vatting.

After manufacture, the cheese samples were cut into blocks approximately 1 kg (2.2 lb) to simplify subsequent sampling. The mozzarella blocks were stored at −2 C. and the cheddar blocks were stored at 10 C.

At 48 hours post manufacture the chemical composition of the cheese products were evaluated. These results are shown below in Table 9.

Also at 48 hours post manufacture the microbial composition of the cheese products were evaluated. These results are shown below in Table 10.

Figure 1:
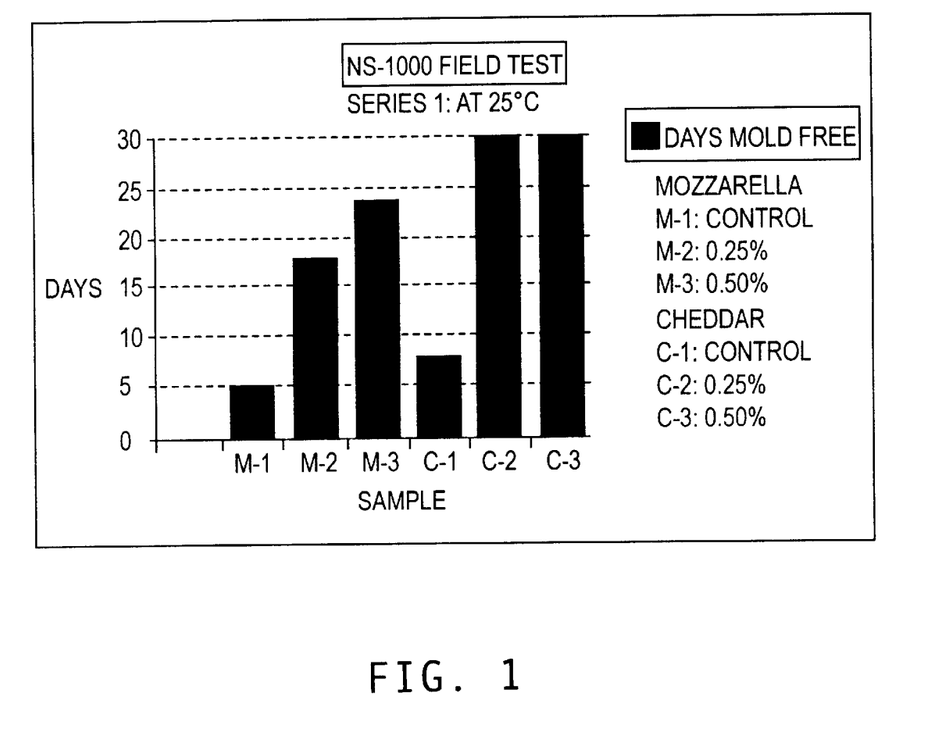
FIG. 1 is a Summary of Yeast and Mold Growth on Cheeses at 25° C. (76° F.).

Immediately after the block samples were prepared, 2×100 gram samples were shredded from the block samples and placed in zip-lock bags at 25 C. and 4 C. Each sample was examined visually each day for mold growth. The results of the 25 C. test are recorded in FIG. 1. As shown, after 30 days, no mold was present on either the cheddar sample containing the mold growth inhibitor of this invention.

Figure 2:
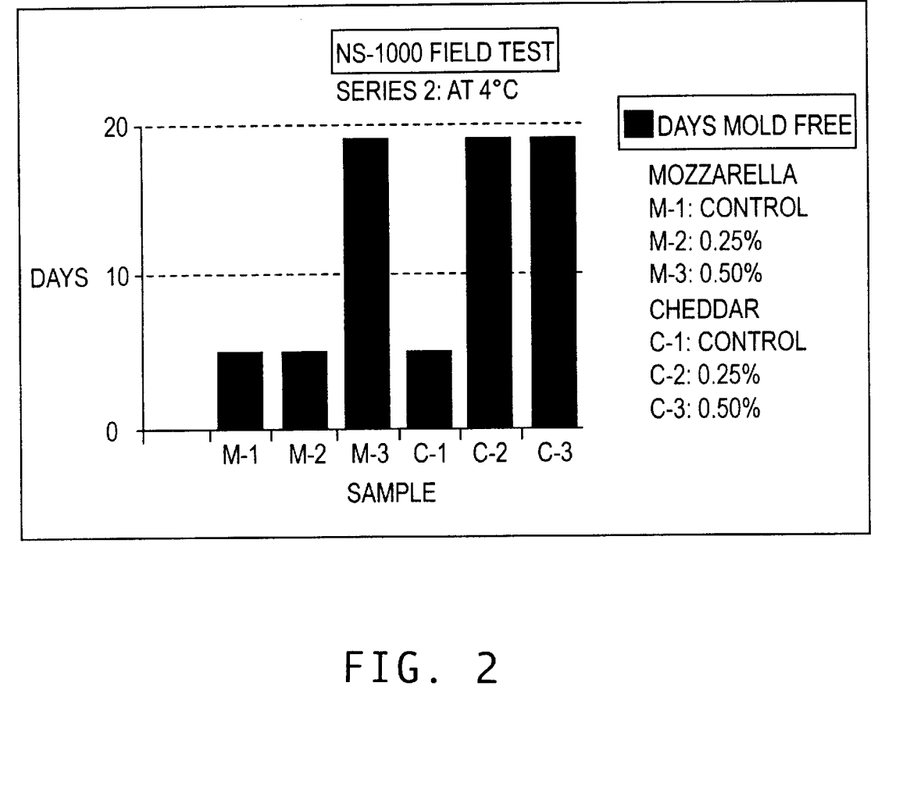
FIG. 2 is a Summary of Yeast and Mold Growth on Cheeses at 4° C. (40° F.).

Partial results of the 4 C. test are shown in FIG. 2. At 19 days into the 30 day test, the mozzarella sample containing 0.5% of the mold growth inhibiting product of this invention and both the cheddar samples were mold free.

Immediately after the samples were prepared, the samples containing the mold growth inhibitor of this invention were evaluated and given points for flavor, background, bitterness, etc. From a possible 105 points, the mozzarella samples containing the mold growth inhibitor of this invention were awarded 92 points giving an 88% rating. From a possible 72 points, the cheddar was awarded 67 points for a 93% rating.

While this invention has been described in relation to the preferred embodiment, it is to be understood that various modifications thereof will now be apparent to one skilled in the art upon reading this specification, and it is intended to cover such modifications which fall within the scope of the following claims.

TABLE 7

SUMMARY OF MOZZARELLA MANUFACTURING

|  | Vat 1 Control | Vat 2 .25% | Vat 3 .50% |
|---|---|---|---|
| P/F Ratio | 1.7 | 1.7 | 1.7 |
| Pasteurization temp (°C.) | Standard | Standard | Standard |
| Temp milk to vat (°C.) | 34.5 | 34.5 | 34.5 |
| Starter type | Mesophiles | Mesophiles | Mesophiles |
| Starter ratio | 1:1:1 | 1:1:1 | 1:1:1 |
| Starter % | 4 | 4 | 4 |
| Prime to pH | 6.35 | 6.35 | 6.35 |
| Rennet type | Calf | Calf | Calf |
| ml Rennet/100 liters milk | 7 | 7 | 7 |
| Setting time (min) | −25 | −25 | −25 |
| Cook temp (°C.) | 39.5 | 39.5 | 39.5 |
| Drain pH | 5.90 | 5.90 | 5.90 |
| Salt added to C/S Water | 1.25 kg | 1.2 kg | 1.2 kg |
| Salting rate-curd | 170 g/100/milk | 170 g/100/milk | 170 g/100/milk |
| Substance X | 0 | Container A* | Container B* |
| Mellowing time (min) | 15 | 15 | 15 |
| Stretching temp (°C.) | 65 | 65 | 65 |
| Packed in | 10 kg bags | 10 kg bags | 10 kg bags |
| Cooling water (°C.) | 5–10 | 5–10 | 5–10 |

*Container A contains 0.25%; Container B contains 0.50%

TABLE 8

SUMMARY OF CHEDDAR MANUFACTURING

|  | Vat 1 Control | Vat 2 .25% | Vat 3 .50% |
|---|---|---|---|
| P/F Ratio | 0.8 | 0.8 | 0.8 |
| Pasteurization temp (°C.) | Standard | Standard | Standard |
| Temp milk to vat (°C.) | 32 | 32 | 32 |
| Starter type | Mesophiles | Mesophiles | Mesophiles |
| Starter ratio | 1:1:1 | 1:1:1 | 1:1:1 |
| Starter % | 1.4 | 1.4 | 1.4 |
| Rennet type | Calf | Calf | Calf |
| ml Rennet/100 liters milk | 16 | 16 | 16 |
| Setting time (min) | −30 | −30 | −30 |
| Cook temp (°C.) | 38 | 38 | 38 |
| Drain pH | 6.20 | 6.20 | 6.20 |
| Salt added to C/S Water | 1.25 kg | 1.2 kg | 1.2 kg |
| Salting rate-curd | 270 g/100/milk | 270 g/100/milk | 270 g/100/milk |
| Substance X | 0 | Container A* | Container B* |
| Pressing | Normal | Normal | Normal |
| Packed in | 20 kg bags | 20 kg bags | 20 kg bag |
| Storage temp (°C.) | 10 | 10 | 10 |

*Container A contains 0.25%; Container B contains 0.50%.

TABLE 9

SUMMARY OF CHEMICAL DATA 48 HOURS POST MANUFACTURE

| Test SSU | C02003 Fat % | C03003 Moisture % | C07000 pH | C08000 Salt % |
|---|---|---|---|---|
| 3/14/95 Mozzarella |  |  |  |  |
| Vat 1 (Control) | 20.0 | 47.1 | 5.44 | 1.48 |
| Vat 2 (.25%) | 19.5 | 47.4 | 5.41 | 1.50 |
| Vat 3 (.50%) | 19.5 | 48.2 | 5.42 | 1.49 |
| 3/15/95 Cheddar |  |  |  |  |
| Vat 1 (Control) | 34.5 | 36.3 | 5.11 | 1.75 |
| Vat 2 (.25%) | 34.5 | 36.2 | 5.24 | 1.75 |
| Vat 3 (.50%) | 34.0 | 35.8 | 5.34 | 1.88 |

TABLE 10

SUMMARY OF MICROBIAL DATA 48 HOURS POST MANUFACTURE

| SAMPLE | Phosphate | Coliform | E. Coli | Yeast & Mold | NSLAB | COAG Staph | POS c/u/g | JAP THD 1 g | APC 1 g |
|---|---|---|---|---|---|---|---|---|---|
| Cheddar |  |  |  |  |  |  |  |  |  |
| Vat 1 - Control | P | <10 | neg | <10 | 1600 | 0,0,0 | <10 |  |  |
| Vat 2 - 0.25% | P | <10 | neg | <10 | 2000 | 2,2,0 | 40 |  |  |
| Vat 3 - 0.50% | P | <10 | neg | <10 | 340 | 2,1,0 | 30 |  |  |
| Mozzarella |  |  |  |  |  |  |  |  |  |
| Vat 1 - Control | P | <10 | neg | <10 | <10 | neg 0,0,0 | neg <10 | 380 | 2600 |
| Vat 2 - 0.25% | P | <10 | neg | <10 | 30 | neg 0,0,0 | <10 | 160 | 1200 |
| Vat 3 - 0.50% | P | <10 | neg | <10 | <10 | neg 0,0,0 | <10 | 300 | 1200 |

What is claimed and desired to be secured by letters patent is as follows:

1. A mold growth inhibiting product for incorporation into foodstuffs formed by reacting azodicarbonamide with a second compound selected from the group consisting of acetic acid, paraben, calcium acetate, benzoic acid, sodium benzoate, potassium benzoate, calcium benzoate, citric acid, lactic acid, fumaric acid, sorbic acid, potassium sorbate, calcium sorbate, sodium sorbate, propionic acid, potassium propionate, calcium propionate, sodium propionate and mixtures thereof before incorporating said product into a foodstuff, such that when said product is incorporated into a foodstuff it does not impart an off-flavor, off-odor, off-texture or off-color to the foodstuff.

2. The mold growth inhibiting product of claim 1, wherein said azodicarbonamide is heated at a sufficient temperature and for a sufficient time to react with said second compound before the product is incorporated into said foodstuffs, such that when said product is incorporated into said foodstuffs, it does not impart an off-flavor, off-odor, off-texture or off-color.

3. The mold growth inhibiting product of claim 2, wherein said azodicarbonamide is separated from said second compound by a gas permeable separator means to form a tri-layered combination.

4. The product of claim 3, wherein said tri-layered combination is heated at a sufficient temperature for a sufficient time to decompose and vaporize said azodicarbonamide to form decomposition gases, said gases permeate said separator means and react with said second compound to form said product.

5. The product of claim 4, wherein said tri-layered combination is heated to a temperature greater than about 320° F.

6. The product of claim 4 wherein said tri-layered combination is heated to a temperature of about 385° F. for about 10 to about 20 minutes.

7. The product of claim 4, wherein said separator means is comprised of a stainless steel wire mesh.

8. The mold growth inhibiting product of claim 1 wherein said product is mixed and is present in the foodstuffs in the amount of about 0.01 to about 20.0 percent by total weight of the foodstuffs.

9. A mold growth inhibiting product for incorporation into foodstuffs formed by reacting a mixture of azodicarbonamide and a decomposition enhancing compound with a second compound selected from the group consisting of acetic acid, paraben, calcium acetate, benzoic acid, sodium benzoate, potassium benzoate, calcium benzoate, citric acid, lactic acid, fumaric acid, sorbic acid, potassium sorbate, calcium sorbate, sodium sorbate, propionic acid, potassium propionate, calcium propionate, sodium propionate, and mixtures thereof, before incorporating said product into a foodstuff, such that when said product is incorporated into a foodstuff it does not impart an off-flavor, off-odor, off-texture or off-color to the foodstuff.

10. The product of claim 9, wherein said mixture is separated from the second compound by a gas permeable separator means to form a tri-layered combination, said combination is then heated to a sufficient temperature for a sufficient time to cause a reaction between the azodicarbonamide and the second compound to form said product.

11. The product of claim 9, wherein said combination is heated to a temperature greater than about 320° F.

12. The product of claim 9, wherein said decomposition enhancing compound is selected from the group consisting of a metal oxide, metal salt, organometallic complex, citric acid, calcium sulfate, triethanolamine and mixtures thereof.

13. The product of claim 9, wherein said decomposition enhancing compound is present in the amount of about 0.004% to about 30% by total weight of the mixture, the remaining being azodicarbonamide.

14. The product of claim 9, wherein said product is added to the foodstuffs in the amount of about 0.01 to about 20.0 percent by total weight of the raw ingredients for preparing the foodstuffs.

15. A mold growth inhibiting product for incorporation into foodstuffs formed by reacting a compound selected from the group consisting of sorbic acid, sodium sorbate, calcium sorbate, potassium sorbate, propionic acid, sodium propionate, calcium propionate, potassium propionate and mixtures thereof with a mixture of gases selected from the group consisting of nitrogen, carbon monoxide, carbon dioxide, and ammonia, before incorporating said product into a foodstuff, such that when said product is incorporated into a foodstuff in an amount sufficient to cause mold growth inhibition it does not impart an off-flavor, off-odor, off-texture or off-color to the foodstuff.

16. The product of claim 15, wherein said mixture of gases comprises about 30% to 70% nitrogen, about 10% to 30% carbon monoxide, about 2% to 10% carbon dioxide, and about 2% to 10% ammonia.

17. The product of claim 15, wherein said compound and said mixture of gases are heated to a temperature sufficient to form said product.

18. A mold growth inhibiting product for incorporation into foodstuffs formed by reacting a compound selected from the group consisting of benzoic acid, sodium benzoate, calcium benzoate, potassium benzoate, acetic acid, paraben, calcium acetate, citric acid, lactic acid, fumaric acid, sorbic acid, sodium sorbate, calcium sorbate, potassium sorbate, propionic acid, sodium propionate, calcium propionate, potassium propionate and mixtures thereof with a mixture of gases selected from the group consisting of nitrogen, carbon monoxide, carbon dioxide, and ammonia, before incorporating said product into a foodstuff, such that when said product is incorporated into a foodstuff it does not impart an off-flavor, off-odor, off-texture or off-color to the foodstuff;

wherein said gas mixture is derived from decomposing azodicarbonamide.

* * * * *